(12) United States Patent
Michaelis et al.

(10) Patent No.: US 7,516,359 B2
(45) Date of Patent: Apr. 7, 2009

(54) SYSTEM AND METHOD FOR USING INFORMATION RELATING TO A DETECTED LOSS OF LOCKSTEP FOR DETERMINING A RESPONSIVE ACTION

(75) Inventors: Scott L. Michaelis, Plano, TX (US); Anurupa Rajkumari, Round Rock, TX (US); William B. McHardy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 558 days.

(21) Appl. No.: 10/972,835

(22) Filed: Oct. 25, 2004

(65) Prior Publication Data

US 2006/0107114 A1    May 18, 2006

(51) Int. Cl.
*G06F 11/00* (2006.01)
(52) U.S. Cl. .......................................... 714/11; 714/12
(58) Field of Classification Search ............. 714/11–13; 712/31
See application file for complete search history.

(56) References Cited

U.S. PATENT DOCUMENTS

| | | | |
|---|---|---|---|
| 4,358,823 A | 11/1982 | McDonald et al. | |
| 5,226,152 A | 7/1993 | Klug et al. | |
| 5,249,188 A | 9/1993 | McDonald | |
| 5,537,655 A | 7/1996 | Truong | |
| 5,675,794 A | 10/1997 | Meredith | |
| 5,751,932 A | 5/1998 | Horst et al. | |
| 5,758,058 A | 5/1998 | Milburn | |
| 5,764,660 A | 6/1998 | Mohat | |
| 5,896,523 A | 4/1999 | Bissett et al. | |
| 5,915,082 A * | 6/1999 | Marshall et al. ............... | 714/11 |
| 5,991,900 A | 11/1999 | Garnett | |
| 6,065,135 A | 5/2000 | Marshall et al. | |
| 6,141,770 A * | 10/2000 | Fuchs et al. ................... | 714/11 |
| 6,148,348 A | 11/2000 | Garnett et al. | |
| 6,220,581 B1 | 4/2001 | Mueller | |
| 6,263,452 B1 | 7/2001 | Jewett et al. | |
| 6,438,687 B2 | 8/2002 | Klein | |
| 6,473,869 B2 | 10/2002 | Bissett et al. | |
| 6,560,682 B1 | 5/2003 | Miller et al. | |
| 6,604,177 B1 | 8/2003 | Kondo et al. | |
| 6,615,366 B1 | 9/2003 | Grochowski et al. | |
| 6,625,749 B1 * | 9/2003 | Quach ......................... | 714/10 |
| 6,675,324 B2 * | 1/2004 | Marisetty et al. .............. | 714/30 |
| 6,687,851 B1 | 2/2004 | Somers et al. | |

(Continued)

OTHER PUBLICATIONS

Filed concurrently herewith, entitled "System and Method for Maintaining in a Multi-Processor System a Spare Processor That is in Lockstep for Use in Recovering From Loss of Lockstep for Another Processor".

(Continued)

*Primary Examiner*—Christopher S McCarthy

(57) ABSTRACT

According to one embodiment, a method comprises detecting a loss of lockstep (LOL) for a processor module. The method further comprises determining a type of LOL that is detected, and, based at least in part on the determined type of LOL, determining a responsive action to take for the LOL. According to one embodiment, a method comprises detecting a loss of lockstep (LOL) for a processor module. The method further comprises using information identifying at least one of type of the detected LOL and source of the detected LOL to determine a responsive action to take for the LOL.

11 Claims, 5 Drawing Sheets

U.S. PATENT DOCUMENTS

| | | | |
|---|---|---|---|
| 6,754,787 B2 | 6/2004 | Miller et al. | |
| 6,920,581 B2 | 7/2005 | Bigbee et al. | |
| 6,948,092 B2 * | 9/2005 | Kondo et al. | 714/12 |
| 7,003,691 B2 * | 2/2006 | Safford et al. | 714/11 |
| 7,020,800 B2 | 3/2006 | Fu et al. | |
| 7,085,959 B2 | 8/2006 | Safford | |
| 7,155,721 B2 * | 12/2006 | Safford et al. | 718/104 |
| 7,191,292 B2 | 3/2007 | Chaudhry et al. | |
| 7,225,355 B2 | 5/2007 | Yamazaki et al. | |
| 7,237,144 B2 * | 6/2007 | Safford et al. | 714/11 |
| 7,251,746 B2 | 7/2007 | Fox et al. | |
| 2002/0144177 A1 | 10/2002 | Kondo et al. | |
| 2002/0152420 A1 | 10/2002 | Chaudhry et al. | |
| 2003/0051190 A1 * | 3/2003 | Marisetty et al. | 714/11 |
| 2003/0070050 A1 | 4/2003 | Miller et al. | |
| 2003/0126498 A1 | 7/2003 | Bigbee et al. | |
| 2003/0135711 A1 | 7/2003 | Shoemaker et al. | |
| 2003/0140281 A1 | 7/2003 | Fue et al. | |
| 2004/0006722 A1 * | 1/2004 | Safford | 714/11 |
| 2004/0019771 A1 * | 1/2004 | Quach | 712/229 |
| 2004/0078650 A1 * | 4/2004 | Safford et al. | 714/11 |
| 2004/0078651 A1 | 4/2004 | Safford et al. | |
| 2004/0153857 A1 | 8/2004 | Yamazaki et al. | |
| 2005/0172164 A1 | 8/2005 | Fox et al. | |
| 2005/0240806 A1 | 10/2005 | Bruckert et al. | |
| 2005/0240811 A1 | 10/2005 | Safford et al. | |
| 2005/0240829 A1 | 10/2005 | Stafford et al. | |
| 2006/0085677 A1 | 4/2006 | Safford et al. | |
| 2006/0136672 A1 | 6/2006 | Chanudhry et al. | |
| 2006/0248384 A1 | 11/2006 | Safford | |
| 2006/0248684 A1 | 11/2006 | Vosbikian et al. | |

OTHER PUBLICATIONS

Filed concurrently herewith, entitled "System and Method for Establishing a Spare Processor for Recovering From Loss of Lockstep in a Boot Processor".

Filed concurrently herewith, entitled "System and Method for Configuring Lockstep Mode of a Processor Module".

Filed concurrently herewith, entitled "System and Method for Providing Firmware Recoverable Lockstep Protection".

Filed concurrently herewith, entitled "System and Method for Switching the Role of Boot Processor to a Spare Processor Responsive to Detection of Loss of Lockstep in a Boot Processor".

Filed concurrently herewith, entitled "System and Method for Reestablishing Lockstep for a Processor Module for Which Loss of Lockstep is Detected".

Filed concurrently herewith, entitled "System and Method for System Firmware Causing an Operating System to Idle a Processor".

Filed concurrently herewith, entitled "System and Method for Reintroducing a Processor Module to an Operating System After Lockstep Recovery".

* cited by examiner

SYSTEM AND METHOD FOR USING INFORMATION RELATING TO A DETECTED LOSS OF LOCKSTEP FOR DETERMINING A RESPONSIVE ACTION

CROSS-REFERENCE TO RELATED APPLICATIONS

The present application is related to the following concurrently filed and commonly assigned U.S. patent applications: Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR"; Ser. No. 10/973,004 titled "SYSTEM AND METHOD FOR CONFIGURING LOCKSTEP MODE OF A PROCESSOR MODULE"; Ser. No. 10/973,076 titled "SYSTEM AND METHOD FOR PROVIDING FIRMWARE RECOVERABLE LOCKSTEP PROTECTION"; Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR"; Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED"; Ser. No. 10/972,888 titled "SYSTEM AND METHOD FOR SYSTEM FIRMWARE CAUSING AN OPERATING SYSTEM TO IDLE A PROCESSOR"; Ser. No. 10/973,075 titled "SYSTEM AND METHOD FOR REINTRODUCING A PROCESSOR MODULE TO AN OPERATING SYSTEM AFTER LOCKSTEP RECOVERY"; and Ser. No. 10/972,796 titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosures of which are hereby incorporated herein by reference.

DESCRIPTION OF RELATED ART

Silent Data Corruption ("SDC") is a difficult problem in the computing industry. In general, SDC refers to data that is corrupt, but which the system does not detect as being corrupt. SDCs primarily occur due to one of two factors: a) a broken hardware unit or b) a "cosmic" event that causes values to change somewhere in the system. Broken hardware means that a "trusted" piece of hardware is silently giving wrong answers. For example, the arithmetic unit in a processor is instructed to add 1+1 and it returns the incorrect answer 3 instead of the correct answer 2. An example of a cosmic event is when a charged particle (e.g., alpha particle or cosmic ray) strikes a region of a computing system and causes some bits to change value (e.g., from a 0 to a 1 or from a 1 to a 0).

Numerous techniques have been developed for detecting SDC to prevent the SDC from remaining "silent" or "undetected" within a system, as well as preventing such SDC from propagating through the system. Examples of these techniques include parity-based mechanisms and error correcting codes (ECCS) on buses and memory locations, as well as checksums and/or cyclic redundancy checks (CRC) over regions of memory. Parity-based mechanisms are often employed in processors, wherein a parity bit is associated with each block of data when it is stored. The parity bit is set to one or zero according to whether there is an odd or even number of ones in the data block. When the data block is read out of its storage location, the number of ones in the block is compared with the parity bit. A discrepancy between the values indicates that the data block has been corrupted. ECCs are parity-based mechanisms that track additional information for each data block. The additional information allows the corrupted bit(s) to be identified and corrected.

Parity/ECC mechanisms have been employed extensively for caches, memories, and similar data storage arrays. In the remaining circuitry on a processor, such as data paths, control logic, execution logic, and registers (the "execution core"), it is more difficult to apply parity/ECC mechanisms for SDC detection. Thus, there is typically some unprotected area on a processor in which data corruption may occur and the parity/ECC mechanisms do not prevent the corrupted data from actually making it out onto the system bus. One approach to SDC detection in an execution core (or other unprotected area of the processor chip) is to employ "lockstep processing." Generally, in lockstep processing two processors are paired together, and the two processors perform exactly the same operations and the results are compared (e.g., with an XOR gate). If there is ever a discrepancy between the results of the lockstep processors, an error is signaled. The odds of two processors experiencing the exact same error at the exact same moment (e.g., due to a cosmic event occurring in both processors at exactly the same time or due to a mechanical failure occurring in each processor at exactly the same time) is nearly zero.

A pair of lockstep processors may, from time to time, lose their lockstep. "Loss of lockstep" (or "LOL") is used broadly herein to refer to any error in the pair of lockstep processors. One example of LOL is detection of data corruption (e.g., data cache error) in one of the processors by a parity-based mechanism and/or ECC mechanism. Another example of LOL is detection of the output of the paired processors not matching, which is referred to herein as a "lockstep mismatch." It should be recognized that in some cases the data in the cache of a processor may become corrupt (e.g., due to a cosmic event), which once detected (e.g., by a parity-based mechanism or ECC mechanism of the processor) results in LOL. Of course, unless such corrupt data is acted upon by the processor, the output of that processor will not fail to match the output of its paired processor and thus a "lockstep mismatch" will not occur. For example, suppose that a value of "1" is stored to first location of cache in each of a pair of lockstep processors and a value of "1" is also stored to a second location of cache in each of the pair of lockstep processors. Further suppose that a cosmic event occurs for a first one of the processors, resulting in the first location of its cache being changed from "1" to 37 0", and thus corrupted. This data corruption in the first processor is a LOL for the pair. An error detection mechanism of this first processor may detect the data corruption, thus detecting the LOL. If the processors are instructed to act on the data of their first cache locations, then a lockstep mismatch will occur as the output of each of the processors will not match. For instance, if the processors each add the data stored to the first location of their respective cache with the data stored to the second location of their respective cache, the first processor (having the corrupt data) will output a result of "1" (0+1=1) while the second processor outputs a result of "2" (1+1=2), and thus their respective outputs will not match.

By employing such techniques as parity-based error detection mechanisms and output comparisons for lockstep paired processors, SDC detection can be enhanced such that practically no SDC occurring in a processor goes undetected (and thus such SDC does not remain "silent") but instead results in detection of LOL. However, the issue then becomes how best for the system to respond to detected LOL. The traditional response to detected LOL has been to crash the system to ensure that the detected error is not propagated through the system. That is, LOL in one pair of lockstep processors in a system halts processing of the system even if other processors that have not encountered an error are present in the system. However, with the increased desire for many systems to maintain high availability, crashing the system each time LOL is detected is not an attractive proposition. This is particularly unattractive for large systems having many processors because cosmic events typically occur more frequently as the processor count goes up, which would result in much more frequent system crashes in those large systems. High availability is a major desire for many customers having large, multi-processor systems, and thus having their system crash every few weeks is not an attractive option. Of course, permitting corrupt data to propagate through the system is also not a viable option.

Prior solutions attempting to resolve at least some detected SDCs without requiring the system to be crashed have been Operating System ("OS") centric. That is, in certain solutions the OS has been implemented in a manner to recover from a detected LOL without necessarily crashing the system. This OS-centric type of solution requires a lot of processor and platform specific knowledge to be embedded in the OS, and thus requires that the OS provider maintain the OS up-to-date as changes occur in later versions of the processors and platforms in which the OS is to be used. This is such a large burden that most commonly used OSs do not support lockstep recovery.

Certain solutions have attempted to recover from a LOL without involving the OS in such recovery procedure. For instance, in one technique upon LOL being detected, firmware is used to save the state of one of the processors in a lockstep pair (the processor that is considered "good") to memory, and then both processors of the pair are reset and reinitialized. Thereafter, the state is copied from the memory to each of the processors in the lockstep pair. This technique makes the processors unavailable for an amount of time without the OS having any knowledge regarding this unavailability, and if the amount of time required for recovery is too long, the system may crash. That is, typically, if a processor is unresponsive for X amount of time, the OS will assume that the processor is hung and will crashdump the system so that the problem can be diagnosed. Further, in the event that a processor in the pair cannot be reset and reinitialized (e.g., the processor has a physical problem and fails to pass its self-test), this technique results in crashing the system.

BRIEF SUMMARY OF THE INVENTION

According to one embodiment, a method comprises detecting a loss of lockstep (LOL) for a processor module. The method further comprises determining a type of LOL that is detected, and, based at least in part on the determined type of LOL, determining a responsive action to take for the LOL.

According to one embodiment, a method comprises detecting a loss of lockstep (LOL) for a processor module. The method further comprises using information identifying at least one of severity of the detected LOL and source of the detected LOL to determine a responsive action to take for the LOL.

DETAILED DESCRIPTION

Figure 1:
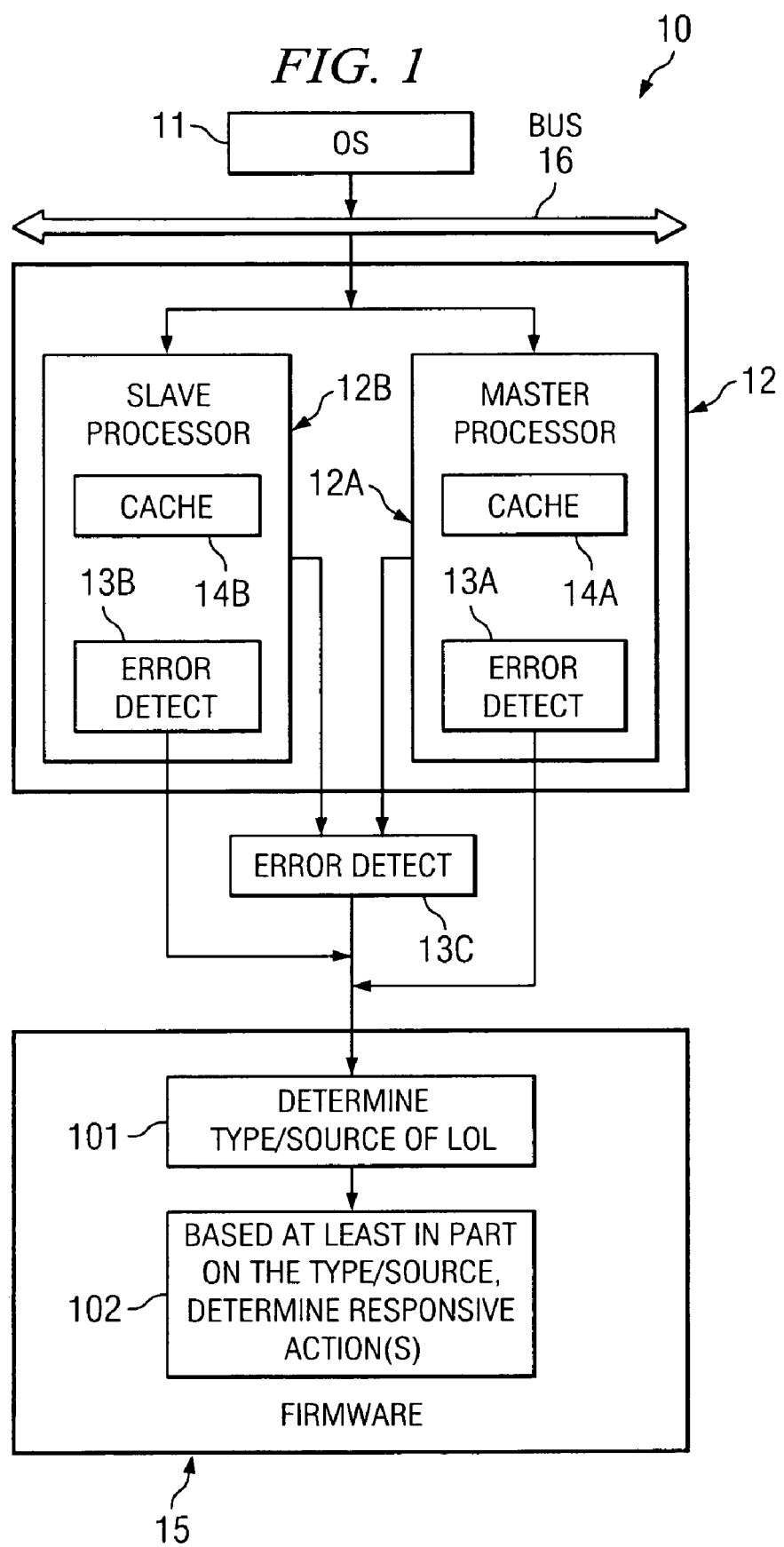
FIG. 1 shows an exemplary embodiment of a system in which information relating to a detected LOL, such as the type and/or source of the LOL, is used by the system's firmware for determining its responsive action(s)

Embodiments are provided herein for using information relating to loss of lockstep (LOL) that is detected for a processor in a system for determining a response to such LOL. For instance, in certain embodiments, an indication of the type and/or source of LOL detected for a processor is received by system firmware, and the system firmware determines a responsive action to trigger based on the type/source of LOL. For example, depending on the type and/or source of LOL detected, the system firmware may take action(s) to recover the lockstep for the processor or the system firmware may crash the system. Thus, the system firmware can utilize the indicated type and/or source of LOL in determining its course of action.

As mentioned above, in certain embodiments, the information relating to a detected LOL includes an indication of the "type" of LOL detected. The "type" of the LOL may identify the severity of the LOL error, the error state (e.g., lockstep mismatch, master error, or slave error), and/or whether the specific processor of a lockstep pair that is the source of the LOL error is known, as examples. In certain instances, the type of LOL indicated indicates the source of the LOL. For instance, if the type of LOL identifies the LOL error state as either "lockstep mismatch," "master error," or "slave error," such information identifies whether the source of the LOL is the master processor of a processor module, the slave processor of the processor module, or unknown.

In one embodiment, the indication of the "type" of LOL details whether the specific processor that is the source of the LOL error is known. For instance, an LOL may be detected for a lockstep pair of processors. Depending on how the LOL is detected (e.g., via parity-based logic or lockstep mismatch detection logic), in certain cases it may be determined which of the lockstep pair of processors has an error that resulted in the LOL. Thus, upon LOL being detected in certain embodiments, the system firmware receives information indicating the type of LOL, which indicates whether the specific processor that has the error causing the LOL is known.

In certain embodiments, the type of the LOL indicates the severity of the LOL, such as whether the error that caused the LOL has been corrected (e.g., by hardware and/or firmware), whether the error is correctable (during system runtime—without crashing the OS), or whether the error is fatal such that it cannot be corrected without crashing the OS. Based on the severity, the system firmware can determine an appropriate responsive action. For instance, if the error has been corrected, the system firmware may proceed with actions for recovering lockstep for the processor module without crashing the system. If the error is correctable, the system firmware may trigger actions for correcting the error (e.g., cause the OS to correct the error), and if the error is corrected proceed with actions for recovering lockstep for the processor module without crashing the system. If the error is fatal, the system firmware may crash the system.

In certain embodiments, a pair of lockstep processors includes a master processor and a slave processor. Error detection logic (e.g., parity-based logic) is associated with the master processor, wherein such error detection logic is operable to detect certain LOL errors arising in the master processor. Also, error detection logic (e.g., parity-based logic) is associated with the slave processor, wherein such error detection logic is operable to detect certain LOL errors arising in the slave processor. Further, error detection logic for detecting lockstep mismatch between the master and slave processor outputs is also provided. Thus, if the error detection logic associated with the master processor detects an LOL error within the master processor, it is known that the LOL error arose in the master processor. Likewise, if the error detection logic associated with the slave processor detects an LOL error within the slave processor, it is known that the LOL error arose in the slave processor. However, if the LOL is detected by the lockstep mismatch detection logic, then it is known that the outputs of the master and slave processors fail to match, but it may be unknown which of the master and slave processors has the incorrect output. Thus, if an LOL is detected by the lockstep mismatch detection logic, it may be unknown which of the processors in the lockstep processor pair is the cause of such LOL.

Accordingly, in certain embodiments, the information relating to the detected LOL specifies whether the LOL was detected by the error detection logic associated with the master processor, whether the LOL was detected by the error detection logic associated with the slave processor, or whether the LOL was detected by the lockstep mismatch detection logic. The system firmware makes use of this information in determining the appropriate action(s) to take responsive to the LOL, wherein the determined action(s) may differ based on the source of the LOL (e.g., whether the LOL was detected by the error detection logic associated with the master processor, the error detection logic associated with the slave processor, or the lockstep mismatch detection logic).

Turning to FIG. 1, an example embodiment of a system 10 is shown in which information relating to a detected LOL, such as the type and/or source of the LOL, is used by the system's firmware for determining its responsive action(s). System 10 includes OS 11, as well as master processor 12A and slave processor 12B (collectively referred to as a lockstep processor pair 12). In certain implementations the lockstep processor pair 12 may be implemented on a single silicon chip, which is referred to as a "dual core processor" in which master processor 12A is a first core and slave processor 12B is a second core. Master processor 12A includes cache 14A, and slave processor 12B includes cache 14B. OS 11 and lockstep processor pair 12 are communicatively coupled to bus 16. Typically, master processor 12A and slave processor 12B are coupled to bus 16 via an interface that allows each of such processors to receive the same instructions to process, but such interface only communicates the output of master processor 12A back onto bus 16. The output of slave processor 12B is used solely for checking the output of mater processor 12A. While only one lockstep processor pair 12 is shown for simplicity in the example of FIG. 1, system 10 may include any number of such lockstep processor pairs. As one specific example, in one implementation system 10 includes 64 lockstep processor pairs, wherein the master processors of the pairs perform parallel processing for the system.

In the example shown in FIG. 1, master processor 12A includes error detect logic 13A, and slave processor 12B includes error detect logic 13B. While shown as included in each of the processors 12A and 12B in this example, in certain embodiments the error detect logic 13A and 13B may be implemented external to processors 12A and 12B. Error detect logic 13A and 13B include logic for detecting errors, such as data cache errors, present in their respective processors 12A and 12B. Examples of error detect logic 13A and 13B include known parity-based mechanisms and ECC mechanisms. Error detect logic 13C (which may be referred to as "lockstep mismatch detection logic") is also included, which may include an XOR (exclusive OR) gate, for detecting a lockstep mismatch between master processor 12A and slave processor 12B . As mentioned above, a lockstep mismatch refers to the output of master processor 12A and slave processor 12B failing to match. While shown as external to the lockstep processor pair 12 in this example, in certain embodiments error detect logic 13C may be implemented on a common silicon chip with processors 12A and 12B.

Lockstep mismatch is one way of detecting a LOL between the master processor 12A and slave processor 12B . A detection of an error by either of error detect logic 13A and 13B also provides detection of LOL in the processors 12A and 12B. Because the detection of LOL by error detect logic 13A and 13B may occur before an actual lockstep mismatch occurs, the detection of LOL by error detect logic 13A and 13B may be referred to as a detection of a "precursor to lockstep mismatch". In other words, once an error (e.g., corrupt data) is detected by error detect logic 13A or 13B, such error may eventually propagate to a lockstep mismatch error that is detectable by error detect logic 13C.

Firmware 15 is also included in system 10, which in this embodiment is invoked upon an error being detected by any of the error detect logics 13A, 13B, and 13C. In certain embodiments, processors 12A and 12B are processors from the Itanium Processor Family (IPF). IPF is a 64-bit processor architecture co-developed by Hewlett-Packard Company and Intel Corporation, which is based on Explicitly Parallel Instruction Computing (EPIC). IPF is a well-known family of processors. IPF includes processors such as those having the code names of MERCED, MCKINLEY, and MADISON. In addition to supporting a 64-bit processor bus and a set of 128 registers, the 64-bit design of IPF allows access to a very large memory (VLM) and exploits features in EPIC. While a specific example implementation of one embodiment is described below for the IPF architecture, embodiments of firmware for using information relating to a detected LOL for determining its responsive action(s) are not limited in application to an IPF architecture, but may be applied as well to other architectures (e.g., 32-bit processor architectures, etc.).

Processor architecture generally comprises corresponding supporting firmware, such as firmware 15 of system 10. For example, as described further below in conjunction with the specific example of FIG. 2, the IPF processor architecture comprises such supporting firmware as Processor Abstraction Layer (PAL), System Abstraction Layer (SAL), and Extended Firmware Interface (EFI). Such supporting firmware may enable, for example, the OS to access a particular function implemented for the processor. For instance, the OS may query the PAL as to the size of the cache implemented for the processor, etc. Other well-known functions provided by the supporting firmware (SAL, EFI) include, for example: (a) performing I/O configuration accesses to discover and program the I/O Hardware (SAL_PCI_CONFIG_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported. While shown as external to the lockstep processor pair 12 in this example, in certain embodiments all or a portion of firmware 15 may be implemented on a common silicon chip with processors 12A and 12B.

In the example embodiment of FIG. 1, upon firmware 15 being invoked responsive to detection of LOL (by any of error detect logics 13A, 13B, and 13C), firmware 15 determines, in operational block 101, information relating to the detected LOL, such as the type and/or source of the LOL. The firmware may determine the type/source of the LOL based upon whether the LOL is detected by the error detect logic 13A associated with master processor 12A, whether the LOL is detected by the error detect logic 13B associated with slave processor 12B, or whether the LOL is detected by the error detect logic 13C, for example. In operational block 102, the firmware determines, based at least in part on the information (e.g., type/source) determined in block 101, a responsive action(s) to take for the detected LOL. As described further herein, different responsive actions may be taken based on the type and/or source of the LOL detected. As described further herein, in certain embodiments implemented for the IPF architecture, the PAL firmware layer of the IPF architecture is implemented to make the determination of block 101 and communicate the determined information (e.g., type and/or source of the LOL) to the SAL firmware layer, and the SAL firmware layer is implemented to use the received information to perform block 102.

Firmware 15 may be employed in a system such as described in concurrently filed and commonly assigned U.S. patent application Ser. No. 10/972,588 titled "SYSTEM AND METHOD FOR PROVIDING FIRMWARE RECOVERABLE LOCKSTEP PROTECTION," the disclosure of which is incorporated herein by reference. This referenced U.S. patent application provides techniques that may be utilized by firmware 15 for recovering, during system runtime (i.e., without crashing the system), from LOL detected for a processor. In certain embodiments, the firmware 15 may selectively determine, based at least in part on the type and/or source of the detected LOL, whether to utilize the lockstep recovery techniques disclosed in U.S. patent application Ser. No. 10/293,076 titled "SYSTEM AND METHOD FOR PROVIDING FIRMWARE RECOVERABLE LOCKSTEP PROTECTION"and/or which of the lockstep recovery techniques disclosed therein to utilize.

Figure 2:
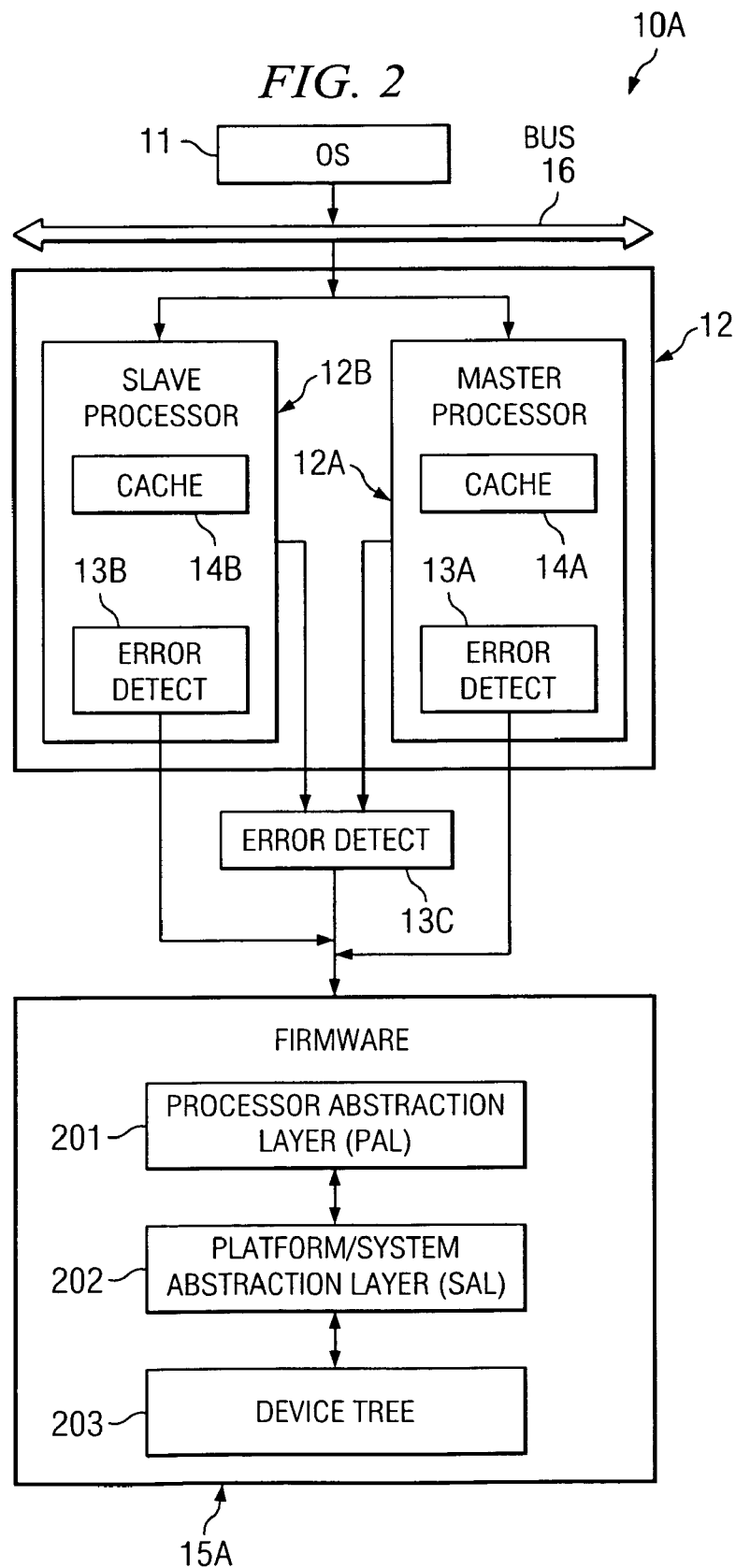
FIG. 2 shows a block diagram of one embodiment implemented for the IA-64 processor architecture.

FIG. 2 shows a block diagram of one embodiment of the above system 10, which is implemented for the IPF processor architecture and is labeled as system $10_A$. The quintessential model of the traditional IPF architecture is given in the *Intel IA-64 Architecture Software Developer's Manual, Volume*2: *IA-64 System Architecture*, in section 11.1 *Firmware Model*, the disclosure of which is hereby incorporated herein by reference. Accordingly, in this example embodiment of system $10_A$, firmware 15, labeled as firmware $15_A$, includes processor abstraction layer (PAL) 201 and platform/system abstraction layer (SAL) 202. In general, PAL 201 is firmware provided by Intel for its processors, and SAL 202 is developed by an original equipment manufacturer (OEM) for the specific system/platform in which the processors are to be employed. PAL 201, SAL 202, as well as an extended firmware interface (EFI) layer (not shown), together provide, among other things, the processor and system initialization for an OS boot in an IPF system.

It should be noted that while the above description of PAL and SAL is specific to the IPF architecture, other architectures may include a "PAL" and "SAL" even though such firmware layers may not be so named or specifically identified as separate layers. In general, such a PAL layer may be included in a given system architecture to provide an interface to the processor hardware. The interface provided by the PAL layer is generally dictated by the processor manufacturer. Similarly, a SAL layer may be included in a given system architecture to provide an interface from the operating system to the hardware. That is, the SAL may be a system-specific interface for enabling the remainder of the system (e.g., OS, etc.) to interact with the non-processor hardware on the system and in some cases be an intermediary for the PAL interface.

The boot-up process of a traditional IPF system, for example, proceeds as follows: When the system is first powered on, there are some sanity checks (e.g., power on self-test) that are performed by microprocessors included in the system platform, which are not the main system processors that run applications. After those checks have passed, power and clocks are given to a boot processor (which may, for example, be master processor 12A). The boot processor begins executing code out of the system's Read-Only Memory (ROM) (not specifically shown in FIG. 2). The code that executes is the PAL 201, which gets control of system 10. PAL 201 executes to acquire all of the processors in system $10_A$ (recall that there may be many lockstep processor pairs 12) such that the processors begin executing concurrently through the same firmware.

After it has performed its duty of initializing the processor(s), PAL 201 passes control of system $10_A$ to SAL 202. It is the responsibility of SAL 202 to discover what hardware is present on the system platform, and initialize it to make it available for the OS 11. When main memory is initialized and functional, the firmware $15_A$ is copied into the main memory. Then, control is passed to EFI (not shown), which is responsible for activating boot devices, which typically includes the disk. The EFI reads the disk to load a program into memory, typically referred to as an operating system loader. The EFI loads the OS loader into memory, and then passes it control of system $10_A$ by branching the boot processor into the entry point of such OS loader program.

The OS loader program then uses the standard firmware interfaces to discover and initialize system $10_A$ further for control. One of the things that the OS loader typically has to do in a multi-processor system is to retrieve control of the other processors (those processors other than the boot processor). For instance, at this point in a multi-processor system, the other processors may be executing in do-nothing loops. In an ACPI-compatible system, OS 11 makes ACPI calls to parse the ACPI tables to discover the other processors of a multi-processor system in a manner as is well-known in the art. Then OS 11 uses the firmware interfaces to cause those discovered processors to branch into the operating system code. At that point, OS 11 controls all of the processors and the firmware $15_A$ is no longer in control of system $10_A$.

As OS 11 is initializing, it has to discover from the firmware $15_A$ what hardware is present at boot time. And in the ACPI standards, it also discovers what hardware is present or added or removed at run-time. Further, the supporting firmware (PAL, SAL, and EFI) are also used during system runtime to support the processor. For example, OS 11 may access a particular function of master processor 12A via the supporting firmware $15_A$, such as querying PAL 201 for the number, size, etc., of the processor's cache 14A. Some other well-known firmware functions that OS 11 may employ during runtime include: (a) PAL 201 may be invoked to configure or change processor features such as disabling transaction queuing (PAL_BUS_SET_FEATURES); (b) PAL 201 may be invoked to flush processor caches (PAL_CACHE_FLUSH); (c) SAL 202 may be invoked to retrieve error logs following a system error (SAL_GET_STATE_INFO, SAL_CLEAR_STATE_INFO); (d) SAL 202 may be invoked as part of hot-plug sequences in which new I/O cards are installed into the hardware (SAL_PCI_CONFIG_READ, SAL_PCI_CONFIG_WRIT); (e) EFI may be invoked to change the boot device path for the next time the system reboots (SetVariable); (f) EFI may be invoked to change the clock/calendar hardware settings; and (g) EFI may be invoked to shutdown the system (ResetSystem).

A "device tree" is provided, which is shown as device tree 203 in this example. Device tree 203 is stored in SRAM (Scratch RAM) on the cell, which is RAM that is reinitialized. Firmware 15A builds the device tree 203 as it discovers what hardware is installed in the system. Firmware then converts this information to the ACPI tables format and presents it to OS 11 so that OS 11 can know what is installed in the system. The ACPI device tables (not shown) are only consumed by OS 11 at boot time, so they are never updated as things change. For OS 11 to find the current status, it calls an ACPI "method" to discover the "current status". The_STA method described above is an example of such an ACPI method. When_STA is called, the AML can look for properties on the device specified in the firmware device tree and convert that into the Result Code bitmap described above. So, if lockstep has been lost on a processor, firmware 15A will set the device tree property that indicates loss of lockstep, then when OS 11 calls_STA for that device, the "lockstep lost" property directs the AML code to return to "0" in the "functioning properly" bit so that OS 11 can know there is a problem with that processor.

According to certain embodiments, the device tree can specify whether lockstep mode is enabled for the system's processors. For instance, in certain embodiments, a user (e.g., the system administrator can designate) via a user interface whether lockstep mode is to be enabled for the system's processors. Accordingly, rather than the processors included in a processor module (e.g., processors 12A and 12B of pair 12) being fixed as lockstep processors, according to certain embodiments if the lockstep mode is not enabled for those processors, the processors may each be presented to the OS (e.g., during the system boot-up process) as available resources, as opposed to the slave processor being used solely for redundant processing of instructions received by the master processor.

Further, in certain embodiments, if a lost lockstep is recovered in accordance with a recovery technique, such as the techniques described in concurrently filed and commonly assigned U.S. patent application Ser. No. 10/973,076 titled "SYSTEM AND METHOD FOR PROVIDING FIRMWARE RECOVERABLE LOCKSTEP PROTECTION," firmware 15A can indicate that lockstep has been recovered in the device tree 203. Then when_STA is called on that device responsive to the OS receiving the "check for device" ACPI method, the present, enabled and functioning bits will all be set and OS 11 will know the CPU is safe to use. A simple example of device tree 203 is shown below in Table 1:

TABLE 1

| Device | Status | Lockstep Enabled |
|---|---|---|
| Processor A | Present, Enabled, and Functioning | Yes |

Figure 3:
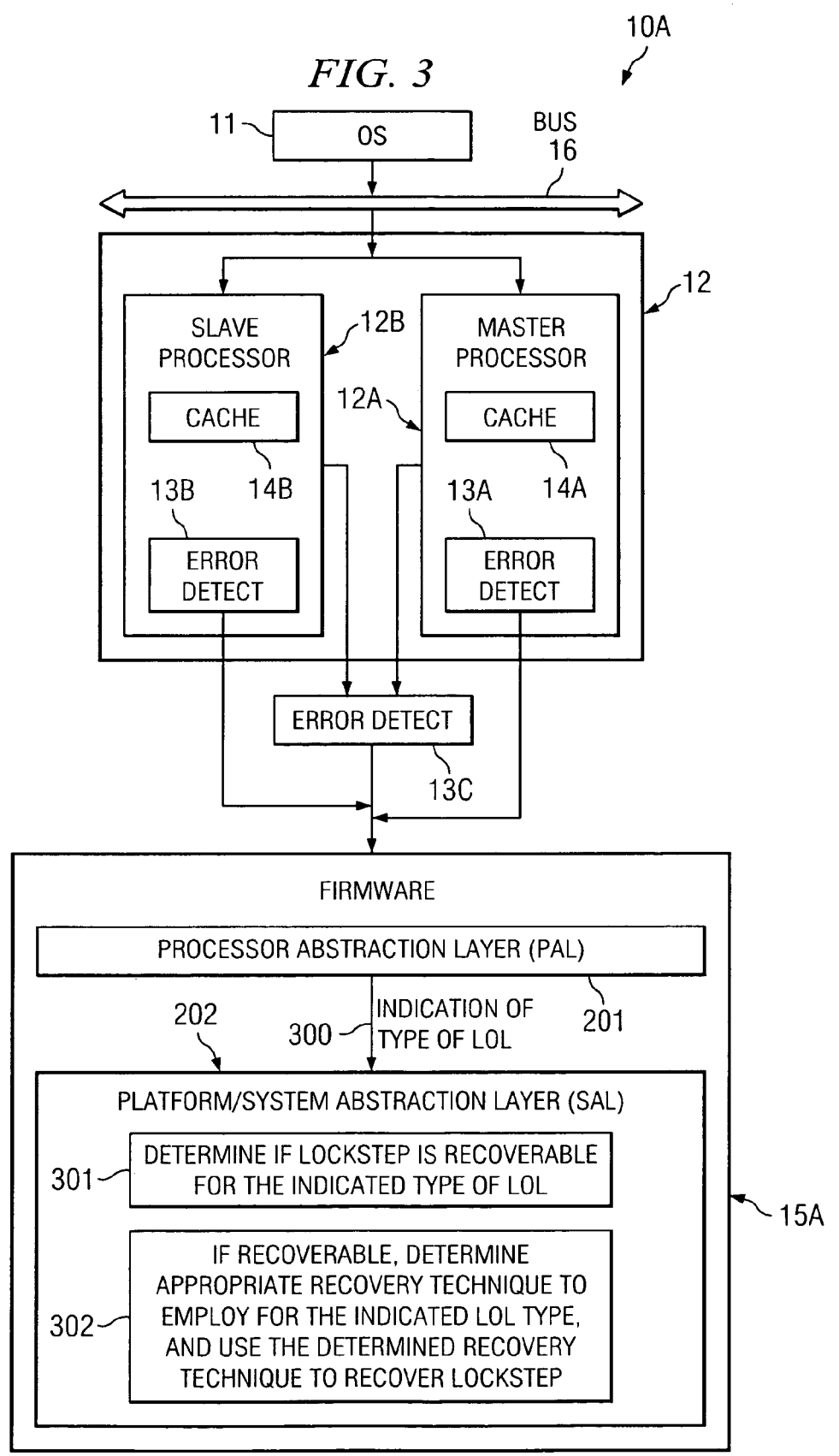
FIG. 3 shows an example of one embodiment in which firmware uses information relating to a detected LOL to determine its responsive action(s)

Turning to FIG. 3, an example of one embodiment in which firmware uses information relating to a detected LOL to determine its responsive action(s) is shown. In this example, firmware 15A (of FIG. 2) includes PAL 201. Upon a LOL being detected for processor module 12, PAL 201 generates an indication 300 of a "type" of the LOL that is detected. Indication 300 may be storing bits to an error register that is accessible by SAL 202, wherein the stored bits indicate the type of the LOL. As described further herein, the "type" of the LOL may identify, for example, the severity of the error, the error state (e.g., lockstep mismatch, master error, or slave error), and/or whether the specific processor of a lockstep pair that is the source of the LOL error is known. In some embodiments, rather than or in addition to the type of error being indicated by indication 300, such indication 300 may indicate the "source" of the LOL. The source of the LOL may identify, for example, the error detect logic that detected the LOL and/or the identification of the specific processor (e.g., master 12A or slave 12B) in lockstep pair 12 for which the error was detected (or "unknown" if the identification is not known, such as in the case of a lockstep mismatch occurring).

Control is then passed to SAL 202, wherein SAL 202 uses the indication 300 of the type of LOL to determine its responsive action(s). In this specific example, in operational block 301, SAL 202 uses the indication 300 of the type of LOL to determine if lockstep is recoverable for the indicated type of LOL. If determined to be recoverable, then in operational block 302 SAL 202 determines an appropriate recovery technique to employ for the indicated LOL type, and uses the determined recovery technique to recover lockstep.

Figure 4:
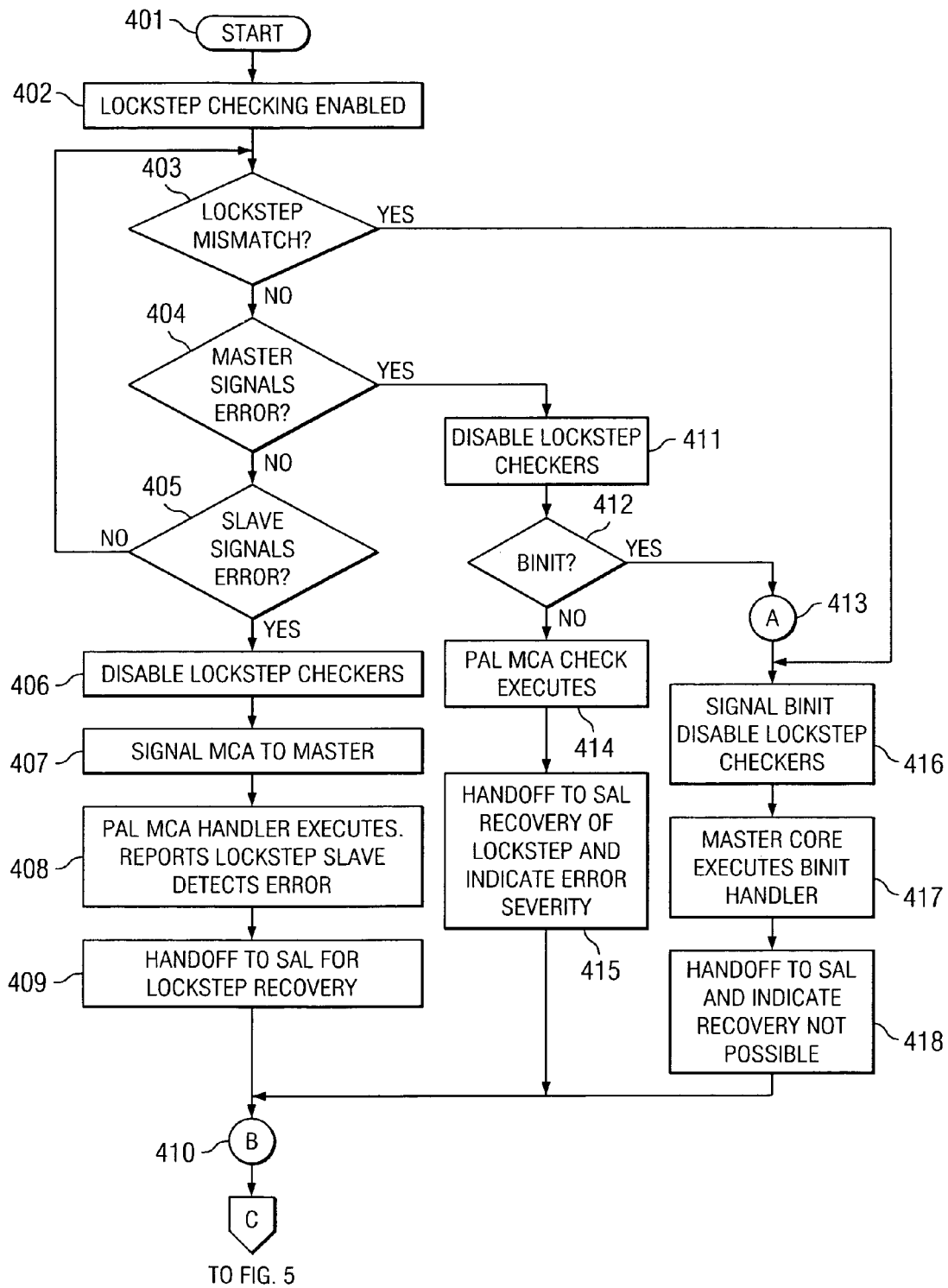
FIG. 4 shows an exemplary operational flow diagram for a processor module detecting LOL and processor firmware determining a type of the LOL according to one embodiment.

Turning to FIG. 4, operation of the processor hardware and PAL firmware according to one embodiment is described. Specifically, FIG. 4 illustrates how a CPU module detects that lockstep has been lost and how PAL handles the detected LOL according to one embodiment. Operation of this exemplary embodiment starts in operational block 401. Normal processor operation begins with the processor module operating with its lockstep mode enabled in operational block 402. According to certain embodiments, whether the lockstep mode is enabled for the processor module is configurable, such as disclosed in concurrently filed and commonly assigned U.S. patent application Ser. No. 10/293,004 titled "SYSTEM AND METHOD FOR CONFIGURING LOCKSTEP MODE OF A PROCESSOR MODULE", the disclosure of which is hereby incorporated herein by reference. Accordingly, the operation of the exemplary flow diagram of FIG. 4 is performed when lockstep mode is enabled for a processor module, and a different operational flow may be followed in instances in which the processor module's lockstep mode is disabled.

Because lockstep mode is enabled for the processor module, the error checking of operational blocks 403, 404, and 405 are performed to detect any occurrence of LOL between the processor pair in the processor module. In operational block 403, error detect logic determines if a lockstep mismatch is detected for the processor module. For instance, error detect logic 13C of FIGS. 1-3 determines whether a lockstep mismatch has occurred for the processor module 12. If a lockstep mismatch is not detected in block 403, operation advances to block 404 whereat error detect logic determines if an LOL error is detected for the master processor. Thus, for instance, error detect logic 13A of FIGS. 1-3 determines whether an error is detected for the master processor 12A. If an error is not signaled by the error detect logic for the master processor, operation advances to block 405 where error detect logic determines if an LOL error is detected for the slave processor. Thus, for instance, error detect logic 13B of FIGS. 1-3 determines whether an error is detected for the slave processor 12B. If an error is not signaled by the error detect logic for the slave processor, operation returns to operational block 403 and the processor module continues with its normal processing until a LOL is detected by operational block 403, 404, or 405.

In certain embodiments, a state machine is implemented that specifies the state of the processor module. The state machine may specify, for example, whether the processor module is in a "normal" state in which an error is not detected in any of blocks 403-405, in a "lockstep mismatch" state in which a lockstep mismatch is detected for the processor module in block 403, in a "master error" state in which an error is detected for the processor module's master processor in block 404, or in a "slave error" state in which an error is detected for the processor module's slave processor in block 405. While in the "normal" state, the normal operation of the processor module continues and the error detect logic continues to loop through operational blocks 403-405. Control Status Registers (CSRs) may be implemented in the processor module, wherein the bits of the CSRs indicate the corresponding state of the processor module. The PAL firmware examines the CSRs and determines the state of the processor module.

If an error is detected in block 405 for the slave processor (e.g., by error detect logic 13B of slave processor 12B in FIGS. 1-3), the processor module is in a "slave error" state. In this case, a lockstep mismatch has not been detected (in block 403), nor has an error been detected for the master processor (in block 404). Upon detecting this slave error state in block 405, operation advances to block 406 whereat the lockstep checkers for the processor module are disabled. For instance, error detect logic 13C in FIGS. 1-3 is disabled in block 406. This prevents this error propagating into a lockstep mismatch error, which is not desired because in this case the source of the error (i.e., the slave processor) is known. In operational block 407, a machine check abort (MCA) signal is sent to the master processor to notify the master processor that there is a problem. Accordingly, the master processor, responsive to receiving the MCA signal, can stop processing instructions as normal and allow for the detected error to be handled.

In operational block 408, the PAL firmware executes its MCA handler and reports that the slave processor of the lockstep processor module has detected an error. Thus, the PAL firmware reports an error type that indicates that the LOL error was detected for the slave processor. This error type is reported to predefined CPU registers.

After PAL executes and evaluates the error, it finds the SAL Entry Point (referred to as SAL_A) and branches to that location. The error status and information are contained in the predefined CPU registers that SAL can examine to determine what type (e.g., what severity) of error was encountered. Thus, in operational block 409, the PAL hands off processing of the detected error to the SAL firmware (by branching to the SAL Entry Point), wherein the SAL uses the reported information indicating that the error was detected for the slave processor in determining the appropriate action(s) to trigger in response to the detected LOL (e.g., in attempt to recover lockstep for the processor module). Operation then advances via connector B 410 in the flow diagram to the SAL in operational block 501, and such operation of the SAL firmware according to this illustrative embodiment is described further below in connection with FIG. 5.

If an error is detected in block 404 for the master processor (e.g., by error detect logic 13A of master processor 12A in FIGS. 1-3), the processor module is in a "master error" state. In this case, a lockstep mismatch has not been detected (in block 403). Upon detecting this master error state in block 404, operation advances to block 411 whereat the lockstep checkers for the processor module are disabled. For instance, error detect logic 13C in FIGS. 1-3 is disabled in block 411. This prevents this error propagating into a lockstep mismatch error, which is not desired because in this case the source of the error (i.e., the master processor) is known. In operational block 412, a determination is made as to whether BINIT was signaled by the processor module. As is well known, BINIT refers to Bus Initialization and is a signal that is asserted whenever the CPU suspects that data on the bus cannot be trusted. In general, the BINIT signal indicates that the detected error is so severe that a shut down of the system is needed. Thus, if determined in block 412 that BINIT has been signaled, operation advances via connector 413 in the flow diagram to operational block 416, which is described further below.

If determined in block 412 that BINIT has not been signaled, operation advances to block 414 whereat the PAL firmware executes its MCA handler. In this case, the PAL reports that a master processor error was detected, similar to the PAL reporting in block 408 that a slave processor error was detected. In operational block 415, the PAL hands off processing the detected error to the SAL firmware, wherein the SAL uses the reported information indicating that the error was detected for the master processor in determining the appropriate action(s) to trigger in response to the detected LOL (e.g., in attempt to recover lockstep for the processor module). In certain embodiments, such as the illustrated embodiment of FIG. 4, the PAL determines in block 415 the severity of the detected error. In certain implementations, the determined severity of the error is passed to the SAL, wherein the SAL may utilize this severity in determining the appropriate action to take. Accordingly, the severity of the detected error is information relating to the detected LOL that may be used by the firmware (e.g., SAL) in determining the appropriate responsive action(s) to take in certain embodiments. In one example implementation, if an error is detected for the master processor, the PAL determines if the error is "Corrected" (e.g., the error is fixed in hardware or PAL), "Continuable/Recoverable" in which the error can be fixed by SAL or the OS), or "Fatal" in which the error cannot be corrected without shutting down the system. The PAL may indicate the determined severity of the error in "error type registers," which are registers that are used by the PAL for passing information relating to a detected LOL to the SAL (i.e., registers that are readable by SAL). PAL then passes control to SAL.

Thus, the PAL may determine whether the detected error is a correctable error or a fatal error. In the above-described slave error state, the determination of the severity of the error was not made in this example embodiment. This is because the slave processor is not the processor that is placing data on the bus. However, if the master error state occurs, then the error is evaluated to determine if it is an error from which the system's OS might be able to recover (e.g., by terminating an application, etc.) without crashing the system. If, for example, the LOL error that was detected for the master processor was due to data corruption of kernel data, then the OS can no longer be relied upon and the system would be brought down (i.e., this would be determined as a fatal or "non-recoverable" error).

Once PAL hands off control to the SAL in block 415, then operation advances via connector B 410 in the flow diagram to the SAL in operational block 501. The operation of the SAL firmware according to this illustrative embodiment is described further below in connection with FIG. 5.

In an alternative embodiment a different action than the above-described actions of blocks 411-415 is taken responsive to a detected master error state. In this alternative embodiment, upon a master error state being detected, the processor module switches the role of master processor to the slave (which does not have an error). The former master processor for which the error was detected is made the slave processor. Then, the current slave processor has the error and this "slave error" state can be handled in the manner described above in operational blocks 406-409. Switching the roles of master and slave in the event that an error is detected for the master processor in this manner may improve the recoverability of lockstep, thus further reducing the situations in which the system is to be shut down as a result of the detected error.

If a lockstep mismatch error is detected in block 403 for the processor module (e.g., by error detect logic 13C of processor module 12 in FIGS. 1-3), the processor module is in a "lockstep mismatch" state. This lockstep mismatch is an error that would have been silent data corruption if lockstep was not enabled for the processor module because there is no other error signal indicating this error. In the case of a lockstep mismatch occurring, it is unknown whether the master processor or the slave processor is the source of the error. It is unknown which of the processors in the processor module has good data and which has corrupt data. In this case, operation advances to block 416 where BINIT is signaled, which generates an MCA on the processor module, and then the processor module turns off the lockstep checkers (to prevent a continuous loop between generating a lockstep error and signaling BINIT). The master processor of the processor module executes the BINIT handler in operational block 417 and then hands off control to SAL. Either the MCA or the BINIT handler in PAL sets some bits in the error type register that indicates that a lockstep mismatch occurred. That is, the error type indicates that lockstep was lost for an unknown reason (e.g., the source of the error is unknown). Operation advances via connector B 410 in the flow diagram to the SAL in operational block 501, and, as described further below in connection with FIG. 5, the SAL determines based on this indicated error type that it cannot recover lockstep for the processor module and will thus crash the system. It should be noted that in this case silent data corruption has been prevented (as the lockstep mismatch signaled the occurrence of the error), but the system cannot keep running because the source of the error is unknown. Fortunately, the occurrence of a lockstep mismatch error occurring is statistically very rare because the amount of logic on the processor module that is not protected by parity-based error detect logic is typically very small (and thus in most instances the parity-based error detect logic will detect the error for its corresponding processor).

Figure 5:
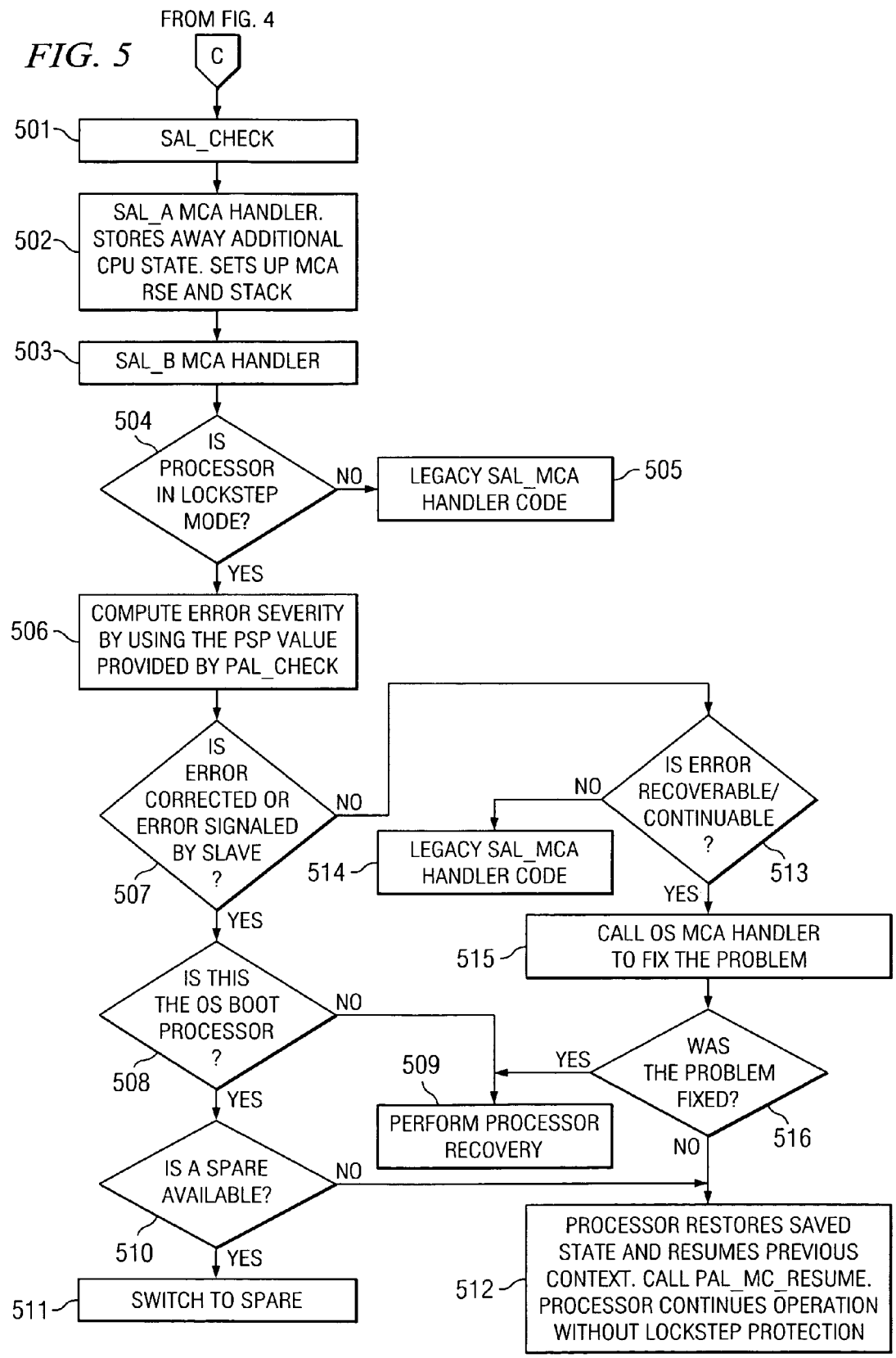
FIG. 5 shows an exemplary operational flow diagram of system firmware in determining a responsive action to a detected LOL based at least in part on the determined type of LOL according to one embodiment.

Turning now to FIG. 5, operation of the SAL firmware responsive to a detected LOL according to one embodiment is described. Once SAL_A is entered, it sets up an execution environment by allocating needed resources in operational block 502. SAL_A is the entry point from PAL to SAL. In this embodiment, whenever PAL branches to SAL, it branches to SAL_A. SAL_A examines the contents of a CPU register to determine why PAL branched to it. The most common reasons are "CPU was reset" or "Error was encountered." SAL_A then branches to either the normal "Reset" SAL code or the "Error" SAL code, which are referred to as SAL_B. In operational block 502, the SAL_A MCA handler stores the state of the known "good" processor of the lockstep pair of processors in the processor module, which the SAL may use later to recover the lockstep. For instance, if the error that caused the LOL was detected for the slave processor, then the state of the master processor is stored, and if the error that caused the LOL was detected for the master processor, then the state of the slave processor is stored. Further, SAL_A sets up an MCA register stack engine (RSE) and stack. Setting up such a RSE and stack is an implementation-specific detail in this exemplary embodiment, and is not critical to the practice of the novel concepts described herein. In this specific example, an explicit stack is provided for performing loads and stores, and also a hardware implemented register stack is provided, wherein the RSE essentially provides main memory for storing information if the hardware implemented register stack becomes full.

Operation then advances to the SAL_B MCA handler in block 503, which performs the operations 504, etc. described hereafter. In operational block 504, the SAL_B MCA handler determines if the processor module is running in lockstep mode. As described further in concurrently filed and commonly assigned U.S. patent application Ser. No. 10/973,004 titled "SYSTEM AND METHOD FOR CONFIGURING LOCKSTEP MODE OF A PROCESSOR MODULE," the disclosure of which is hereby incorporated herein by reference, a device tree may be provided that stores information indicating whether lockstep mode is enabled for the processor module. If lockstep mode is not enabled for the processor module, then the normal error handling is performed in operational block 505. That is, the firmware does not attempt to take action to recover lockstep because lockstep mode is not enabled. If lockstep mode is enabled, SAL checks the indicated error type in operational block 506 (e.g., checks the error type register). In block 507, SAL determines if the error type indicates that the error is either corrected (e.g., was corrected by the hardware and/or PAL) or signaled by the slave processor (i.e., was a slave error state). If the error is not corrected or signaled by the slave processor, SAL determines in operational block 513 whether the error type indicates that the error is recoverable or continuable. In this sense, "recoverable" means that the error may be completely recovered from with no affect on any applications running on the system, where "continuable" means that the system may continue executing (i.e., does not have to be crashed) but a single user application may have to be terminated. If the error type indicates that the error is not recoverable/continuable, then legacy error handling code is executed in this example in block 514.

If the error is determined in block 513 as recoverable/continuable, SAL calls the OS MCA handler to trigger the OS to attempt to correct the problem. In block 516, SAL determines if the OS was successful in correcting the problem. If the problem is corrected, then lockstep needs to be reestablished on the processor module and so a processor recovery procedure is performed in block 509. An example of a processor recovery procedure that may be performed in certain embodiments is described further in concurrently filed and commonly assigned U.S. patent application Ser. No. 10/973,076 titled "SYSTEM AND METHOD FOR PROVIDING FIRMWARE RECOVERABLE LOCKSTEP PROTECTION," the disclosure of which is incorporated herein by reference. If the error is determined in block 516 as not corrected, then operation advances to block 512 whereat PAL_MC_RESUME is called and the processor module continues its execution without lockstep protection. In this case, a notification may be generated and output to notify a user (e.g., system administrator) that the lockstep protection has been lost for the processor module and instructing the user to reboot the system as quickly as possible to reestablish lockstep. This allows the system administrator to perform an orderly shut down and restart of the system at a convenient time, rather than having the system unexpectedly crash.

Various determinations may be made by SAL in operational block 513 to determine whether an error is recoverable/continuable. For instance, if LOL is lost and it is unknown whether the error is on the master or the slave processor, SAL determines in block 513 that the error is not recoverable/continuable (and thus execution will advance to block 514 and the system is crashed). If the error is known to be on the master processor, part of the evaluation in block 513 is to determine if there is a risk of propagating corrupt data throughout the system. If there is such a risk, then the "NO" path is followed from block 513 to operational block 514 and the system is crashed. Thus, operational block 513 guards against allowing the processor to continue its operation in block 512 without lockstep protection if doing so could risk propagating corrupt data throughout the system.

If the error type is determined in block 507 as either corrected or signaled by the slave, then the SAL determines in operational block 508 whether the procedure module for which the error is detected is the OS boot processor. Concurrently filed and commonly assigned U.S. patent application Ser. No. 10/973,076 titled "SYSTEM AND METHOD FOR PROVIDING FIRMWARE RECOVERABLE LOCKSTEP PROTECTION," discloses a technique in which lockstep can be recovered for processors (particularly, non-boot processors) without requiring use of a spare processor. Rather, upon LOL being detected for a lockstep pair of processors, the firmware instructs the OS to idle (or "eject") the lockstep pair of processors for which LOL was detected and then the firmware attempts to reestablish lockstep (e.g., by resetting the processors). If successful in reestablishing lockstep, the firmware triggers the OS to recognize the lockstep pair of processors as again being available for servicing instructions.

However, as described further in concurrently filed and commonly assigned U.S. patent application Ser. No. 10/293,076 titled "SYSTEM AND METHOD FOR PROVIDING FIRMWARE RECOVERABLE LOCKSTEP PROTECTION," for various reasons, in certain system architectures problems arise in attempting to idle (or eject) the boot processor from the system. Thus, in certain embodiments, a spare processor is used for recovering from LOL for the system's boot processor. Accordingly, in operational block 508 the firmware determines whether the processor module for which the LOL was detected is the boot processor, and in this exemplary embodiment the firmware employs different recovery techniques depending on whether the processor module is the boot processor.

If determined in block 508 that the processor module is not the boot processor, then in operational block 509 SAL performs the processor recovery technique described further in concurrently filed and commonly assigned U.S. patent application Ser. No. 10/973,076 titled "SYSTEM AND METHOD FOR PROVIDING FIRMWARE RECOVERABLE LOCKSTEP PROTECTION" in which lockstep is recovered for the processor module without requiring use of a spare processor. If, on the other hand, the processor module is determined in block 508 to be the boot processor, SAL checks in block 510 whether a spare processor has been established. Exemplary techniques for establishing a spare processor for use in recovering from LOL detected for a boot processor are described further in concurrently filed and commonly assigned U.S. patent application Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR," the disclosure of which is hereby incorporated herein by reference.

If determined in block 510 that a spare processor has been established, then the role of boot processor is switched to the spare in operational block 511. Further, once the role of boot processor is switched to the spare, the firmware may attempt to recover lockstep for the processor module for which the LOL was detected, as described further in concurrently filed and commonly assigned U.S. patent application Ser. No. 10/293,076 titled "SYSTEM AND METHOD FOR PROVIDING FIRMWARE RECOVERABLE LOCKSTEP PROTECTION." If determined in block 510 that no spare has been established PAL_MC_RESUME is called in block 512 and normal operation continues without lockstep protection. Again, the system administrator can be notified of the loss of lockstep for the boot processor and may be instructed that the system should be rebooted as soon as possible to reestablish lockstep protection.

While FIGS. 4 and 5 above provide an example of one embodiment in which firmware utilizes determined information relating to a detected LOL (e.g., information specifying a determined type of error), embodiments hereof are not intended to be limited to these specific operational flows. Rather, any other operational flows in which information relating to a detected LOL, such as type of LOL and/or the source of the LOL. The "type" of the LOL may identify, for example, the severity of the error, the error state (e.g., lockstep mismatch, master error, or slave error), and/or whether the specific processor of a lockstep pair that is the source of the LOL error is known. The "source" of the LOL may identify, for example, the error detect logic that detected the LOL and/or the identification of the specific processor (e.g., master or slave) in a lockstep pair for which the error was detected (or "unknown" if the identification is not known, such as in the case of a lockstep mismatch occurring). In certain instances, the type of LOL indicates the source of the LOL. For instance, if the type identifies the error state as either "lockstep mismatch," "master error," or "slave error," such information identifies whether the source if the error is master, slave, or unknown.

What is claimed is:

1. A system comprising:
   a processor module that includes a master processor and a slave processor that operate in lockstep;

error detection logic for detecting loss of lockstep (LOL) for the processor module;

firmware for determining at least one of type of the detected LOL and source of the detected LOL; and firmware for determining, based at least in part on the determined at least one of type and source, a responsive action to the detected LOL, wherein said firmware for determining said responsive action comprises firmware for determining whether to attempt to reestablish lockstep for the processor module without shutting down an operating system of the system, wherein said firmware for determining said responsive action comprises firmware for, if the source of the detected LOL is unknown, determining not to attempt to reestablish lockstep for the processor module without shutting down an operating system of the system.

2. The system of claim 1 wherein said error detection logic includes:

parity-based error detection logic associated with said master processor;

parity-based error detection logic associated with said slave processor; and lockstep mismatch detection logic.

3. The system of claim 2 wherein said source of the detected LOL indicates whether the LOL was detected by said parity-based error detection logic associated with said master processor, said parity-based error detection logic associated with said slave processor, or said lockstep mismatch detection logic.

4. The system of claim 1 wherein said firmware determines said type of the detected LOL.

5. The system of claim 1 wherein said type of the detected LOL corresponds to severity of an error that caused said LOL.

6. The system of claim 1 wherein said type of the detected LOL corresponds to an error state for said processor module.

7. The system of claim 6 wherein said error state comprises one selected from the group consisting of:

lockstep mismatch, master error, and slave error.

8. The system of claim 1 wherein said source of the detected LOL indicates whether a source of the LOL is known.

9. The system of claim 1 wherein said source of the detected LOL indicates whether a root cause of the LOL is the master processor, the slave processor, or unknown.

10. The system of claim 1 wherein said firmware for determining said responsive action to take for the LOL comprises:

firmware for determining a recovery technique to employ for reestablishing lockstep based on said determined LOL type.

11. The system of claim 1 wherein said firmware for determining said responsive action comprises:

if the source of the detected LOL is known, determining to attempt to reestablish lockstep for the processor module without shutting down an operating system of the system.

* * * * *

UNITED STATES PATENT AND TRADEMARK OFFICE
CERTIFICATE OF CORRECTION

PATENT NO. : 7,516,359 B2  Page 1 of 1
APPLICATION NO. : 10/972835
DATED : April 7, 2009
INVENTOR(S) : Scott L. Michaelis et al.

It is certified that error appears in the above-identified patent and that said Letters Patent is hereby corrected as shown below:

In column 1, line 59, delete "(ECCS)" and insert -- (ECCs) --, therefor.

In column 2, line 47, delete ""1" to 37 0"" and insert -- "1" to "0" --, therefor.

In column 7, line 48, delete "10/293,076" and insert -- 10/973,076 --, therefor.

In column 10, line 50, delete "10/293,004" and insert -- 10/973,004 --, therefor.

In column 15, lines 61-62, delete "10/293,076" and insert -- 10/973,076 --, therefor.

In column 16, line 33, delete "10/293,076" and insert -- 10/973,076 --, therefor.

Signed and Sealed this

Fifteenth Day of September, 2009

David J. Kappos
*Director of the United States Patent and Trademark Office*